(12) United States Patent
Fang et al.

(10) Patent No.: US 8,852,297 B2
(45) Date of Patent: *Oct. 7, 2014

(54) FUEL ADDITIVES FOR TREATING INTERNAL DEPOSITS OF FUEL INJECTORS

(75) Inventors: Xinggao Fang, Midlothian, VA (US); Scott D. Schwab, Richmond, VA (US); Julienne M. Galante-Fox, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/454,697

(22) Filed: Apr. 24, 2012

(65) Prior Publication Data

US 2013/0074794 A1    Mar. 28, 2013

Related U.S. Application Data

(63) Continuation-in-part of application No. 13/240,233, filed on Sep. 22, 2011, now Pat. No. 8,758,456.

(51) Int. Cl.
*C10L 1/22* (2006.01)
*F02B 47/04* (2006.01)

(52) U.S. Cl.
CPC ............... *F02B 47/04* (2013.01); *Y02T 10/121* (2013.01)
USPC ............ 44/351; 44/416; 44/420; 44/421; 44/432

(58) Field of Classification Search
USPC ................... 44/351, 416, 420, 421, 432
See application file for complete search history.

(56) References Cited

U.S. PATENT DOCUMENTS

| | | | |
|---|---|---|---|
| 3,015,668 A | 1/1962 | John | |
| 3,809,179 A | 5/1974 | Delaney et al. | |
| 4,152,499 A | 5/1979 | Boerzel et al. | |
| 4,234,435 A | 11/1980 | Meinhardt et al. | |
| 4,256,595 A | 3/1981 | Sung et al. | |
| 4,482,357 A | 11/1984 | Hanlon | |
| 4,897,086 A | 1/1990 | Blain et al. | |
| 4,908,145 A | 3/1990 | Fenoglio | |
| 4,994,197 A | 2/1991 | Blain et al. | |
| 5,080,815 A | 1/1992 | Fenoglio et al. | |
| 5,454,962 A | 10/1995 | Slama et al. | |
| 5,496,480 A * | 3/1996 | Rollin et al. | 508/293 |
| 5,575,823 A | 11/1996 | Wallace et al. | |
| 5,752,989 A | 5/1998 | Henly et al. | |
| 6,150,575 A * | 11/2000 | Angevine et al. | 585/14 |
| 8,021,444 B2 | 9/2011 | Caprotti et al. | |
| 2003/0131527 A1 | 7/2003 | Colucci et al. | |
| 2009/0282731 A1 | 11/2009 | Malfer et al. | |
| 2010/0037514 A1 | 2/2010 | Malfer et al. | |
| 2010/0107479 A1 | 5/2010 | Richardson | |
| 2010/0107482 A1 | 5/2010 | Bennett et al. | |
| 2010/0317552 A1 | 12/2010 | Griffin et al. | |
| 2011/0283603 A1 | 11/2011 | Mabille et al. | |
| 2012/0210966 A1 | 8/2012 | Wager et al. | |
| 2012/0255512 A1 | 10/2012 | Galante-Fox et al. | |

FOREIGN PATENT DOCUMENTS

GB    2280907 A    2/1995

* cited by examiner

*Primary Examiner* — Cephia D Toomer
(74) *Attorney, Agent, or Firm* — Luedeka Neely Group, P.C.

(57) ABSTRACT

A method cleaning up internal components of a fuel injector for a diesel engine. The method includes operating a fuel injected diesel engine on a fuel composition that includes a major amount of diesel fuel and from about 5 to about 500 ppm by weight of a reaction product derived from (a) a hydrocarbyl substituted dicarboxylic acid, anhydride, or ester and (b) an amine compound or salt thereof of the formula

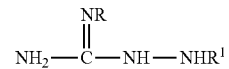

wherein R is selected from the group consisting of hydrogen and a hydrocarbyl group containing from about 1 to about 15 carbon atoms, and $R^1$ is selected from the group consisting of hydrogen and a hydrocarbyl group containing from about 1 to about 20 carbon atoms. The reaction product is characterized by a particular FTIR spectrum.

15 Claims, 8 Drawing Sheets

FUEL ADDITIVES FOR TREATING INTERNAL DEPOSITS OF FUEL INJECTORS

RELATED APPLICATIONS

This application is a continuation-in-part of application Ser. No. 13/240,233, filed Sep. 22, 2011, now U.S. Pat. No. 8,758,456.

TECHNICAL FIELD

The disclosure is directed to certain diesel fuel additives and to method for cleaning and/or preventing internal deposits in injectors for diesel fuel operated engines. In particular the disclosure is directed to methods that are effective against internal deposits in injectors for engines operating on ultra low sulfur diesel fuels.

BACKGROUND AND SUMMARY

Recent changes in diesel fuels and diesel fuel additives have resulted in new injector performance concerns with deposits, including a new type of deposit not experienced with older diesel fuel formulations. The injector performance concerns run across all segments; on-road fleets, mining equipment, farming equipment, railroad and inland marine engines.

Vehicle operators, fuel marketers, and engine manufacturers are now seeing deposits forming on the internal parts of fuel injectors. If left untreated, these deposits may lead to significant power loss, reduced fuel economy, and, in extreme cases, increased downtime and higher maintenance costs due to premature replacement of "stuck injectors." The new deposits are believed to be a result of certain common corrosion inhibitors, biofuel components and acidic friction modifier, or other carboxylic components used in the fuel reacting with trace amounts of transition metals, alkali metal and alkaline earth metals causing salts that are less soluble in ultra low sulfur diesel (ULSD) fuels than in the higher sulfur fuels of the past. When such salts are present in fuel that is used in a High Pressure Common Rail (HPCR) engine design, the salts may tend to deposit in the very tight tolerance areas of the injectors. Such deposits may lead to poor fuel injection, which in turn may lead to lost power, lost fuel economy, rough running engines, and eventually excessive vehicle downtime and maintenance expense.

ULSD now represents about 79% of all distillate fuel supplied in the United States. Also, the Renewable Fuel Standard minimum for biodiesel was raised to 1 billion gallons in 2012. There are indications that the amount of biodiesel required to be used in fuel will be even higher in the future. Accordingly, the changing fuel slate continues to move toward more ULSD (with less solubility for salts that can form) and more biodiesel in the marketplace (another potential source of deposit causing materials in the fuel system).

In accordance with the disclosure, exemplary embodiments provide a method cleaning up internal components of a fuel injector for a diesel engine. The method includes operating a fuel injected diesel engine on a fuel composition that contains a major amount of diesel fuel having a sulfur content of 50 ppm by weight or less and from about 5 to about 500 ppm by weight of a reaction product derived from (a) a hydrocarbyl substituted dicarboxylic acid, anhydride, or ester and (b) an amine compound or salt thereof of the formula wherein R is selected from the group consisting of hydrogen and a hydrocarbyl group containing from about 1 to about 15 carbon atoms, and $R^1$ is selected from the group consisting of hydrogen and a hydrocarbyl group containing from about 1 to about 20 carbon atoms. The reaction product is characterized by an FTIR spectrum having a peak intensity in a region of from about 1630 $cm^{-1}$ to about 1645 $cm^{-1}$ that ranges from about 5 to about 45% of peak intensities of other peaks in a region of from about 1500 $cm^{-1}$ to about 1800 $cm^{-1}$.

Another embodiment of the disclosure provides a method for reducing an amount of salt deposits on internal components of a fuel injector for a fuel injected diesel engine. The method includes operating the diesel engine on a fuel composition that contains a major amount of fuel and a minor amount of a reaction product derived from (a) a hydrocarbyl substituted dicarboxylic acid, anhydride, or ester and (b) an amine compound or salt thereof of the formula wherein R is selected from the group consisting of hydrogen and a hydrocarbyl group containing from about 1 to about 15 carbon atoms, and $R^1$ is selected from the group consisting of hydrogen and a hydrocarbyl group containing from about 1 to about 20 carbon atoms. The reaction product contains less than one equivalent of an amino triazole group per molecule of reaction product.

A further embodiment of the disclosure provides a method for preventing plugging of a fuel filter for fuel injectors of a fuel injected diesel engine. The method includes providing a major amount of fuel and a minor amount of a reaction product derived from (a) a hydrocarbyl substituted dicarboxylic acid, anhydride, or ester and (b) an amine compound or salt thereof of the formula wherein R is selected from the group consisting of hydrogen and a hydrocarbyl group containing from about 1 to about 15 carbon atoms, and $R^1$ is selected from the group consisting of hydrogen and a hydrocarbyl group containing from about 1 to about 20 carbon atoms. The reaction product is characterized by an FTIR spectrum having a peak intensity in a region of from about 1630 $cm^{-1}$ to about 1645 $cm^{-1}$ that ranges from about 5 to about 45% of peak intensities of other peaks in a region of from about 1500 $cm^{-1}$ to about 1800 $cm^{-1}$, and wherein the reaction product contains less than one equivalent of an amino triazole group per molecule of reaction product.

An advantage of the fuel additive described herein is that the additive may not only reduce the amount of internal deposits forming on direct and/or indirect diesel fuel injectors, but the additive may also be effective to clean up dirty fuel injectors and may prevent the plugging of fuel filters in the fuel supply to the fuel injectors.

Additional embodiments and advantages of the disclosure may be set forth in part in the detailed description which follows, and/or may be learned by practice of the disclosure. It is to be understood that both the foregoing general description and the following detailed description are exemplary and explanatory only and are not restrictive of the disclosure, as claimed.

DETAILED DESCRIPTION OF EXEMPLARY EMBODIMENTS

The compositions of the present application may be used in a minor amount in a major amount of diesel fuel and may be made by reacting an amine compound or salt thereof of the formula wherein R is selected from the group consisting of hydrogen and a hydrocarbyl group containing from about 1 to about 15 carbon atoms, and R$^1$ is selected from the group consisting of hydrogen and a hydrocarbyl group containing from about 1 to about 20 carbon atoms with a hydrocarbyl substituted dicarboxylic acid, anhydride, or ester, wherein the reaction product contains less than one equivalent of amino triazole group per molecule of reaction product. The reaction product is characterized by an FTIR spectrum having a peak intensity in a region of from about 1630 cm$^{-1}$ to about 1645 cm-1 that ranges from about 5 to about 45% of peak intensities of other peaks in a region of from about 1500 cm$^{-1}$ to about 1800 cm$^{-1}$.

Figure 1:
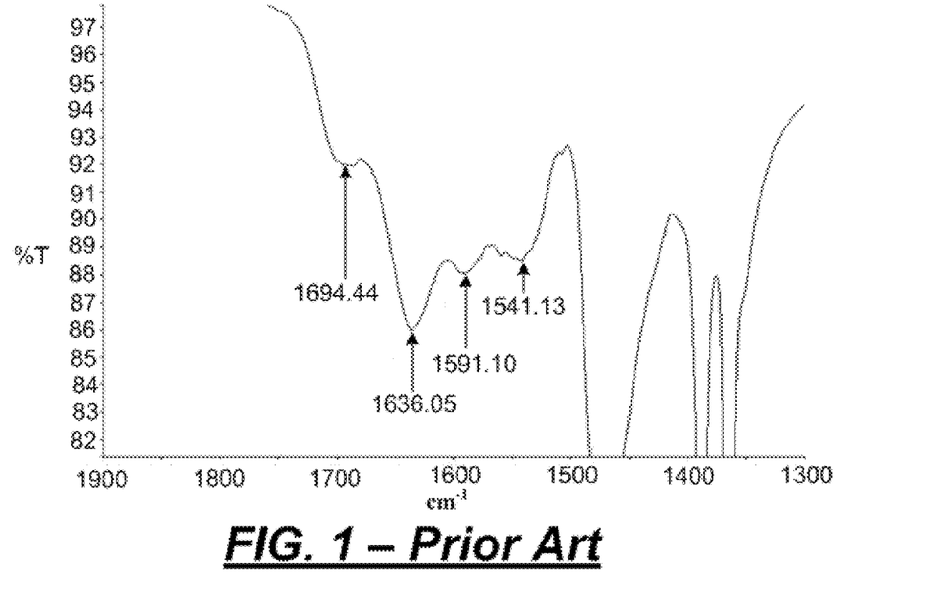
FIG. 1 is a portion of an FTIR spectrum of a prior art product.
Figure 2:
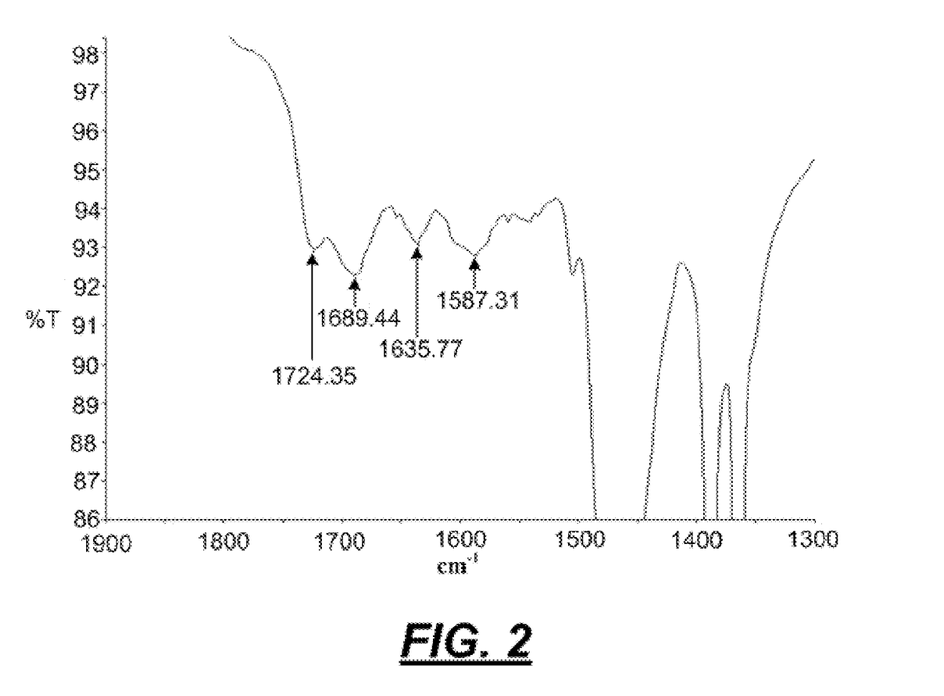
FIG. 2 is a portion of an FTIR spectrum of a reaction product according to the disclosure.

For comparison purposes, FIG. 1 shows an FTIR spectrum of a compound made with from about mole ratio of hydrocarbyl carbonyl to amine ranging from about 1:1 to about 1:2.5. The peak at about 1636 cm$^{-1}$ is believed to be an aminotriazole peak. By comparison, the reaction product made according to the disclosed embodiments has an FTIR spectrum as shown in FIG. 2, wherein the peak intensity at about 1636 cm$^{-1}$ is substantially smaller than the peak intensity of other peaks in a region of from about 1500 cm$^{-1}$ to about 1800 cm$^{-1}$. For example, the reaction product according to the disclosure has a peak intensity in the region of from 1630 cm$^{-1}$ to about 1645 cm$^{-1}$ that ranges from about 5 to about 45% of peak intensities of other peaks in a region of from about 1500 cm$^{-1}$ to about 1800 cm$^{-1}$. In other embodiments, the reaction product has a characteristic peak intensity in the range of from 1630 cm$^{-1}$ to about 1645 cm$^{-1}$ that is no more than 30%, for example no more than 25%, and typically no more than 10% of the intensity of other peaks in the range of from about 1500 cm$^{-1}$ to about 1800 cm$^{-1}$.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, amino, alkylamino, and sulfoxy);

(3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

"Biorenewable fuels" and "biodiesel fuels" as used herein is understood to mean any fuel which is derived from resources other than petroleum. Such resources include, but are not limited to, corn, maize, soybeans and other crops; grasses, such as switchgrass, miscanthus, and hybrid grasses; algae, seaweed, vegetable oils; natural fats; and mixtures thereof. In an aspect, the biorenewable fuel may include monohydroxy alcohols, such as those having from 1 to about 5 carbon atoms. Non-limiting examples of suitable monohydroxy alcohols include methanol, ethanol, propanol, n-butanol, isobutanol, t-butyl alcohol, amyl alcohol, and isoamyl alcohol.

As used herein, the term "major amount" is understood to mean an amount greater than or equal to 50 wt. %, for example from about 80 to about 98 wt. % relative to the total weight of the composition. Moreover, as used herein, the term "minor amount" is understood to mean an amount less than 50 wt. % relative to the total weight of the composition.

As used herein, the term "salts or salt deposits" are understood to mean transition metal, alkali metal or alkaline earth metal carboxylates.

Amine Compound

Suitable amine compounds of the formula may be chosen from guanidines and aminoguanidines or salts thereof wherein R and $R^1$ are as defined above. Accordingly, the amine compound may be chosen from the inorganic salts of guanidines, such as the halide, carbonate, nitrate, phosphate, and orthophosphate salts of guanidines. The term "guanidines" refers to guanidine and guanidine derivatives, such as aminoguanidine. In one embodiment, the guanidine compound for the preparation of the additive is aminoguanidine bicarbonate. Aminoguanidine bicarbonates are readily obtainable from commercial sources, or can be prepared in a well-known manner.

Hydrocarbyl Carbonyl Compound

The hydrocarbyl carbonyl reactant compound of the additive may be any suitable compound having a hydrocarbyl moiety and a carbonyl moiety, and that is capable of bonding with the amine compound to form the additives of the disclosure. Non-limiting examples of suitable hydrocarbyl carbonyl compounds include, but are not limited to, hydrocarbyl substituted succinic anhydrides, hydrocarbyl substituted succinic acids, and esters of hydrocarbyl substituted succinic acids.

In some aspects, the hydrocarbyl carbonyl compound may be a polyalkylene succinic anhydride reactant having the following formula:

wherein $R^2$ is a hydrocarbyl moiety, such as for example, a polyalkenyl radical having a number average molecular weight of from about 100 to about 5,000 daltons. For example, the number average molecular weight of $R^2$ may range from about 200 to about 3,000 daltons, as measured by GPC. Unless indicated otherwise, molecular weights in the present specification are number average molecular weights.

In the above formula, the $R^2$ hydrocarbyl moiety may comprise one or more polymer units chosen from linear or branched alkenyl units. In some aspects, the alkenyl units may have from about 2 to about 10 carbon atoms. For example, the polyalkenyl radical may comprise one or more linear or branched polymer units chosen from ethylene radicals, propylene radicals, butylene radicals, pentene radicals, hexene radicals, octene radicals and decene radicals. In some aspects, the $R^2$ polyalkenyl radical may be in the form of, for example, a homopolymer, copolymer or terpolymer. In one aspect, the polyalkenyl radical is isobutylene. For example, the polyalkenyl radical may be a homopolymer of polyisobutylene comprising from about 10 to about 60 isobutylene groups, such as from about 20 to about 30 isobutylene groups. The polyalkenyl compounds used to form the $R^2$ polyalkenyl radicals may be formed by any suitable methods, such as by conventional catalytic oligomerization of alkenes.

In an additional aspect, the hydrocarbyl moiety $R^2$ may be derived from a linear alpha olefin or an acid-isomerized alpha olefin made by the oligomerization of ethylene by methods well known in the art. These hydrocarbyl moieties can range from about 8 carbon atoms to over 40 carbon atoms. For example, alkenyl moieties of this type may be derived from a linear $C_{18}$ or a mixture of $C_{20-24}$ alpha olefins or from acid-isomerized $C_{16}$ alpha olefins.

In some aspects, high reactivity polyisobutenes having relatively high proportions of polymer molecules with a terminal vinylidene group may be used to form the $R^2$ group. In one example, at least about 60%, such as about 70% to about 90%, of the polyisobutenes comprise terminal olefinic double bonds. There is a general trend in the industry to convert to high reactivity polyisobutenes, and well known high reactivity polyisobutenes are disclosed, for example, in U.S. Pat. No. 4,152,499, the disclosure of which is herein incorporated by reference in its entirety.

Specific examples of hydrocarbyl carbonyl compounds include such compounds as dodecenylsuccinic anhydrides, $C_{16-18}$ alkenyl succinic anhydride, and polyisobutenyl succinic anhydride (PIBSA), and acid and ester compounds derived therefrom. In some embodiments, the PIBSA may have a polyisobutylene portion with a vinylidene content ranging from about 4% to greater than about 90%. In some embodiments, the molar ratio of the number of carbonyl groups to the number of hydrocarbyl moieties in the hydrocarbyl carbonyl compound may range from about 0.5:1 to about 5:1.

In some aspects, approximately one mole of maleic anhydride may be reacted per mole of polyalkylene, such that the resulting polyalkenyl succinic anhydride has about 0.8 to about 1 succinic anhydride group per polyalkylene substituent. In other aspects, the molar ratio of succinic anhydride groups to alkylene groups may range from about 0.5 to about 3.5, such as from about 1 to about 1.1.

The hydrocarbyl carbonyl compounds may be made using any suitable method. Methods for forming hydrocarbyl carbonyl compounds are well known in the art. One example of a known method for forming a hydrocarbyl carbonyl compound comprises blending a polyolefin and maleic anhydride. The polyolefin and maleic anhydride reactants are heated to temperatures of, for example, about 150° C. to about 250° C., optionally, with the use of a catalyst, such as chlorine or peroxide. Another exemplary method of making the polyalkylene succinic anhydrides is described in U.S. Pat. No. 4,234,435, which is incorporated herein by reference in its entirety.

The hydrocarbyl carbonyl and amine compounds described above may be mixed together under suitable conditions to provide the desired reaction product of the present disclosure. In one aspect of the present disclosure, the reactant compounds may be mixed together in a mole ratio of hydrocarbyl carbonyl compound to amine ranging from about 1:0.5 to about 1:1.5. For example, the mole ratio of the reactants may range from about 1:0.5 to about 1:0.95.

Suitable reaction temperatures may range from about 130° C. to less than about 200° C. at atmospheric pressure. For example, reaction temperatures may range from about 140° C. to about 160° C. Any suitable reaction pressures may be used, such as, including subatmospheric pressures or superatmospheric pressures. However, the range of temperatures may be different from those listed where the reaction is carried out at other than atmospheric pressure. The reaction may be carried out for a period of time within the range of about 1 hour to about 8 hours, preferably, within the range of about 2 hours to about 6 hours.

In some aspects of the present application, the dispersant products of this application may be used in combination with a diesel fuel soluble carrier. Such carriers may be of various types, such as liquids or solids, e.g., waxes. Examples of liquid carriers include, but are not limited to, mineral oil and oxygenates, such as liquid polyalkoxylated ethers (also known as polyalkylene glycols or polyalkylene ethers), liquid polyalkoxylated phenols, liquid polyalkoxylated esters, liquid polyalkoxylated amines, and mixtures thereof. Examples of the oxygenate carriers may be found in U.S. Pat. No. 5,752,989, issued May 19, 1998 to Henly et. al., the description of which carriers is herein incorporated by reference in its entirety. Additional examples of oxygenate carriers include alkyl-substituted aryl polyalkoxylates described in U.S. Patent Publication No. 2003/0131527, published Jul. 17, 2003 to Colucci et. al., the description of which is herein incorporated by reference in its entirety.

In other aspects, compositions of the present application may not contain a carrier. For example, some compositions of the present application may not contain mineral oil or oxygenates, such as those oxygenates described above.

One or more additional optional compounds may be present in the fuel compositions of the disclosed embodiments. For example, the fuels may contain conventional quantities of cetane improvers, corrosion inhibitors, cold flow improvers (CFPP additive), pour point depressants, detergents, solvents, demulsifiers, lubricity additives, friction modifiers, amine stabilizers, combustion improvers, dispersants, antioxidants, heat stabilizers, conductivity improvers, metal deactivators, marker dyes, organic nitrate ignition accelerators, cyclomatic manganese tricarbonyl compounds, and the like. In some aspects, the compositions described herein may contain about 10 weight percent or less, or in other aspects, about 5 weight percent or less, based on the total weight of the additive concentrate, of one or more of the above additives. Similarly, the fuels may contain suitable amounts of conventional fuel blending components such as methanol, ethanol, dialkyl ethers, and the like.

In some aspects of the disclosed embodiments, organic nitrate ignition accelerators that include aliphatic or cycloaliphatic nitrates in which the aliphatic or cycloaliphatic group is saturated, and that contain up to about 12 carbons may be used. Examples of organic nitrate ignition accelerators that may be used are methyl nitrate, ethyl nitrate, propyl nitrate, isopropyl nitrate, allyl nitrate, butyl nitrate, isobutyl nitrate, sec-butyl nitrate, tert-butyl nitrate, amyl nitrate, isoamyl nitrate, 2-amyl nitrate, 3-amyl nitrate, hexyl nitrate, heptyl nitrate, 2-heptyl nitrate, octyl nitrate, isooctyl nitrate, 2-ethylhexyl nitrate, nonyl nitrate, decyl nitrate, undecyl nitrate, dodecyl nitrate, cyclopentyl nitrate, cyclohexyl nitrate, methylcyclohexyl nitrate, cyclododecyl nitrate, 2-ethoxyethyl nitrate, 2-(2-ethoxyethoxy)ethyl nitrate, tetrahydrofuranyl nitrate, and the like. Mixtures of such materials may also be used.

Examples of suitable optional metal deactivators useful in the compositions of the present application are disclosed in U.S. Pat. No. 4,482,357, issued Nov. 13, 1984, the disclosure of which is herein incorporated by reference in its entirety. Such metal deactivators include, for example, salicylidene-o-aminophenol, disalicylidene ethylenediamine, disalicylidene propylenediamine, and N,N'-disalicylidene-1,2-diaminopropane.

Suitable optional cyclomatic manganese tricarbonyl compounds which may be employed in the compositions of the present application include, for example, cyclopentadienyl manganese tricarbonyl, methylcyclopentadienyl manganese tricarbonyl, indenyl manganese tricarbonyl, and ethylcyclopentadienyl manganese tricarbonyl. Yet other examples of suitable cyclomatic manganese tricarbonyl compounds are disclosed in U.S. Pat. No. 5,575,823, issued Nov. 19, 1996, and U.S. Pat. No. 3,015,668, issued Jan. 2, 1962, both of which disclosures are herein incorporated by reference in their entirety.

When formulating the fuel compositions of this application, the additives may be employed in amounts sufficient to reduce or inhibit deposit formation in a diesel engine. In some aspects, the fuels may contain minor amounts of the above described reaction product that controls or reduces the formation of engine deposits, for example injector deposits in diesel engines. For example, the diesel fuels of this application may contain, on an active ingredient basis, an amount of the reaction product in the range of about 5 mg to about 500 mg of reaction product per Kg of fuel, such as in the range of about 20 mg to about 120 mg of reaction product per Kg of fuel. In aspects, where a carrier is employed, the fuel compositions may contain, on an active ingredients basis, an amount of the carrier in the range of about 1 mg to about 100 mg of carrier per Kg of fuel, such as about 5 mg to about 50 mg of carrier per Kg of fuel. The active ingredient basis excludes the weight of (i) unreacted components such as polyalkylene compounds associated with and remaining in the product as produced and used, and (ii) solvent(s), if any, used in the manufacture of the reaction product either during or after its formation but before addition of a carrier, if a carrier is employed.

The additives of the present application, including the reaction product described above, and optional additives used in formulating the fuels of this invention may be blended into the base diesel fuel individually or in various sub-combinations. In some embodiments, the additive components of the present application may be blended into the diesel fuel concurrently using an additive concentrate, as this takes advantage of the mutual compatibility and convenience afforded by the combination of ingredients when in the form of an additive concentrate. Also, use of a concentrate may reduce blending time and lessen the possibility of blending errors.

The diesel fuels of the present application may be applicable to the operation of both stationary diesel engines (e.g., engines used in electrical power generation installations, in pumping stations, etc.) and ambulatory diesel engines (e.g., engines used as prime movers in automobiles, trucks, road-grading equipment, military vehicles, etc.). For example, the fuels may include any and all middle distillate fuels, diesel fuels, biorenewable fuels, biodiesel fuel, gas-to-liquid (GTL) fuels, jet fuel, alcohols, ethers, kerosene, low sulfur fuels, synthetic fuels, such as Fischer-Tropsch fuels, liquid petroleum gas, bunker oils, coal to liquid (CTL) fuels, biomass to liquid (BTL) fuels, high asphaltene fuels, fuels derived from coal (natural, cleaned, and petcoke), genetically engineered biofuels and crops and extracts therefrom, and natural gas. "Biorenewable fuels" as used herein is understood to mean any fuel which is derived from resources other than petroleum. Such resources include, but are not limited to, corn, maize, soybeans and other crops; grasses, such as switchgrass, miscanthus, and hybrid grasses; algae, seaweed, vegetable oils; natural fats; and mixtures thereof. In an aspect, the biorenewable fuel can comprise monohydroxy alcohols, such as those comprising from 1 to about 5 carbon atoms. Non-limiting examples of suitable monohydroxy alcohols include methanol, ethanol, propanol, n-butanol, isobutanol, t-butyl alcohol, amyl alcohol, and isoamyl alcohol.

Accordingly, aspects of the present application are directed to methods for reducing the amount of injector deposits of a diesel engine having at least one combustion chamber and one or more direct fuel injectors in fluid connection with the combustion chamber. In another aspect, the improvements may also be observed in indirect diesel fuel injectors. In some aspects, the methods comprise injecting a hydrocarbon-based compression ignition fuel comprising the reaction product additive of the present disclosure, through the injectors of the diesel engine into the combustion chamber, and igniting the compression ignition fuel. In some aspects, the method may also comprise mixing into the diesel fuel at least one of the optional additional ingredients described above.

In one embodiment, the diesel fuels of the present application may be essentially free, such as devoid, of conventional succinimide dispersant compounds. The term "essentially free" is defined for purposes of this application to be concentrations having substantially no measurable effect on injector cleanliness or deposit formation.

In yet other aspects of the present application, the fuel additive may be free or substantially free of 1,2,4-triazoles. For example, the compositions may be substantially free of triazoles of formula II, wherein $R^4$ and $R^5$ are independently chosen from hydrogen and hydrocarbyl groups, with the proviso that at least one of $R^4$ and $R^5$ is not hydrogen. Examples of hydrocarbyl groups include $C_2$ to $C_{50}$ linear, branched or cyclic alkyl groups; $C_2$ to $C_{50}$ linear, branched or cyclic alkenyl groups; and substituted or unsubstituted aryl groups, such as phenyl groups, tolyl groups and xylyl groups.

EXAMPLES

The following examples are illustrative of exemplary embodiments of the disclosure. In these examples as well as elsewhere in this application, all parts and percentages are by weight unless otherwise indicated. It is intended that these examples are being presented for the purpose of illustration only and are not intended to limit the scope of the invention disclosed herein.

In the following examples, the effect the detergent additive had on diesel fuel contaminated with carboxylate salts for high pressure common rail diesel fuel systems was evaluated. An engine test was used to demonstrate the propensity of fuels to provoke fuel injector sticking and was also used to demonstrate the ability of certain fuel additives to prevent or reduce the amount of internal deposit in the injectors. An engine dynamometer test stand was used for the installation of the Peugeot DW10 diesel engine for running the injector sticking tests. The engine was a 2.0 liter engine having four cylinders. Each combustion chamber had four valves and the fuel injectors were DI piezo injectors have a Euro V classification.

The core protocol procedure consisted of running the engine through a cycle for 8-hours and allowing the engine to soak (engine off) for a prescribed amount of time. The injector performance was then characterized by measuring the cylinder exhaust temperature for each cylinder. A test was stopped and considered to have failed (one or more injectors sticking) if the exhaust temperature of any cylinder was more than 65° C. above any other cylinder exhaust temperature at any point in time. A test was also considered to have failed if after allowing the engine to cool to ambient temperature, a cold start showed a temperature difference of 45° C. or more in cylinder exhaust temperatures. Sticking of the needle and thus failure could also be confirmed by disassembling the injector and subjectively determining the force required to remove the needle from the nozzle housing. Cleanliness tests were run for keep-clean performance as well as clean-up performance.

Test preparation involved flushing the previous test's fuel from the engine prior to removing the injectors. The test injectors were inspected, cleaned, and reinstalled in the engine. If new injectors were selected, the new injectors were put through a 16-hour break-in cycle. Next, the engine was started using the desired test cycle program. Once the engine was warmed up, power was measured at 4000 RPM and full load to check for full power restoration after cleaning the injectors. If the power measurements were within specification, the test cycle was initiated. The following Table 1 provides a representation of the DW10 sticking test cycle that was used to evaluate the fuel additives according to the disclosure.

TABLE 1

One hour representation of DW10 sticking test cycle.

| Step | Duration (minutes) | Engine speed (rpm) | Load (%) | Torque (Nm) | Boost air after Intercooler (° C.) |
|---|---|---|---|---|---|
| 1 | 2 | 1750 | 20 | 62 | 45 |
| 2 | 7 | 3000 | 60 | 173 | 50 |
| 3 | 2 | 1750 | 20 | 62 | 45 |
| 4 | 7 | 3500 | 80 | 212 | 50 |
| 5 | 2 | 1750 | 20 | 62 | 45 |
| 6 | 10 | 4000 | 100 | * | 50 |
| 7 | 2 | 1250 | 10 | 25 | 43 |
| 8 | 7 | 3000 | 100 | * | 50 |
| 9 | 2 | 1250 | 10 | 25 | 43 |
| 10 | 10 | 2000 | 100 | * | 50 |
| 11 | 2 | 1250 | 10 | 25 | 43 |
| 12 | 7 | 4000 | 100 | * | 50 |

Example 1

Injector Sticking Engine Test

Figure 3:
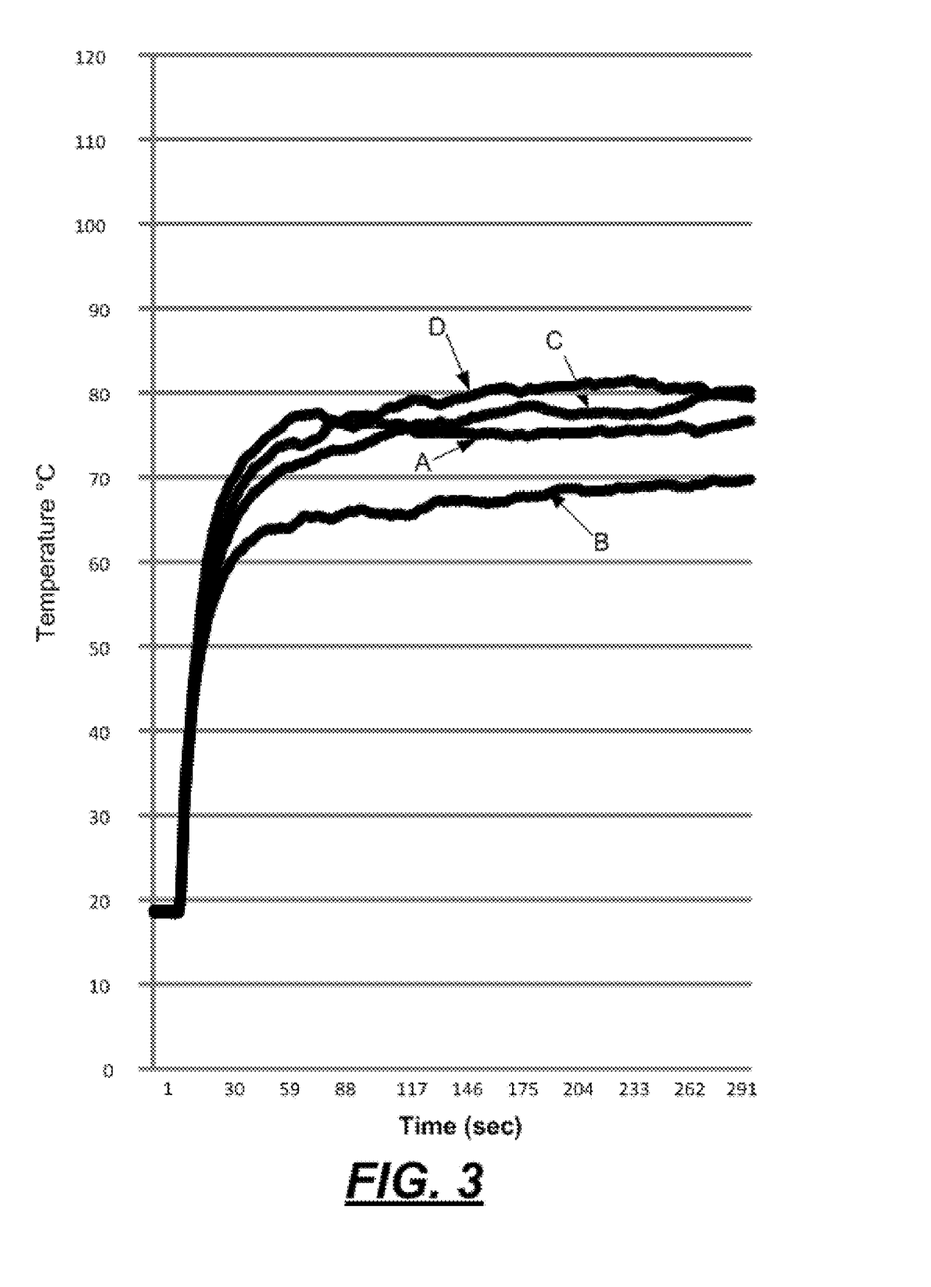
FIG. 3 is a graphical representation of exhaust gas cylinder temperatures over time for a four cylinder diesel engine at the beginning of a test for fuel additives.
Figure 4:
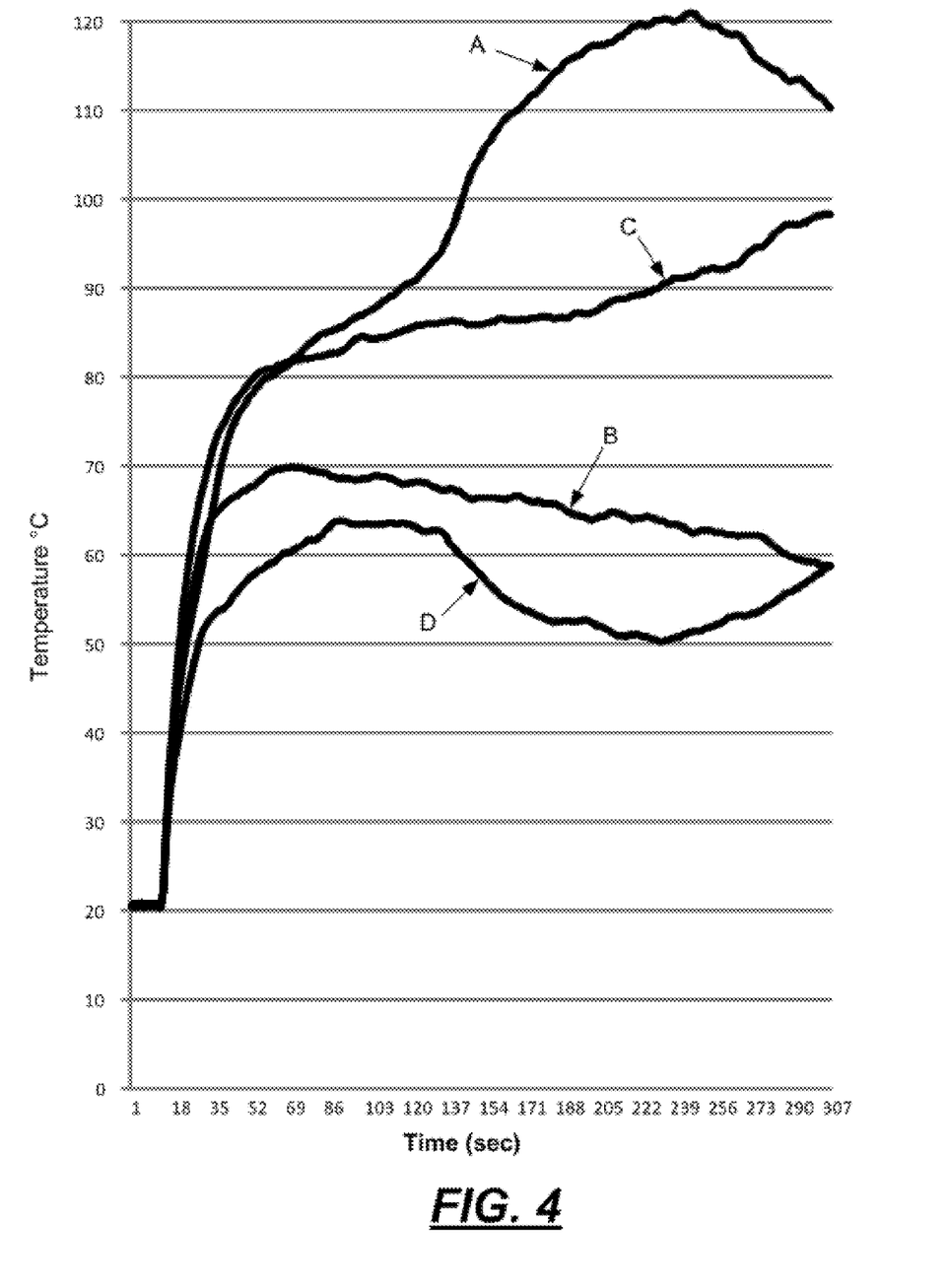
FIG. 4 is a graphical representation of exhaust gas cylinder temperatures over time for a four cylinder diesel engine after eight hours of testing using no fuel detergent.

Diesel engine nozzle sticking tests were conducted using the Peugeot DW10 engine following the protocol of Table 1. For keep-clean testing, the engine was run with diesel fuel doped with metal carboxylate salts and with the detergent additive indicated in the example. For clean-up testing, the engine was first run with diesel fuel doped with metal carboxylate salts without a detergent additive to establish a baseline of stuck fuel injectors. Next, the engine was run with the same fuel containing the detergent additive indicated. In all of the tests, the fuels tested contained 200 ppmv lubricity modifier and 1600 ppmv cetane improver, 20 ppmw of dodecyl succinic acid, 3 ppmw of NaOH, and 25 ppmwv of water. At the beginning of the test, no injector sticking was indicated by a uniform exhaust gas temperature for all 4-cylinders as shown in FIG. 3. However, a cold start of the engine after 8 hours showed injector sticking as shown in FIG. 4. In all of the figures, curve A is cylinder 1, curve B is cylinder 2, curve C is cylinder 3 and curve D is cylinder 4.

Comparative Example 2

Figure 5:
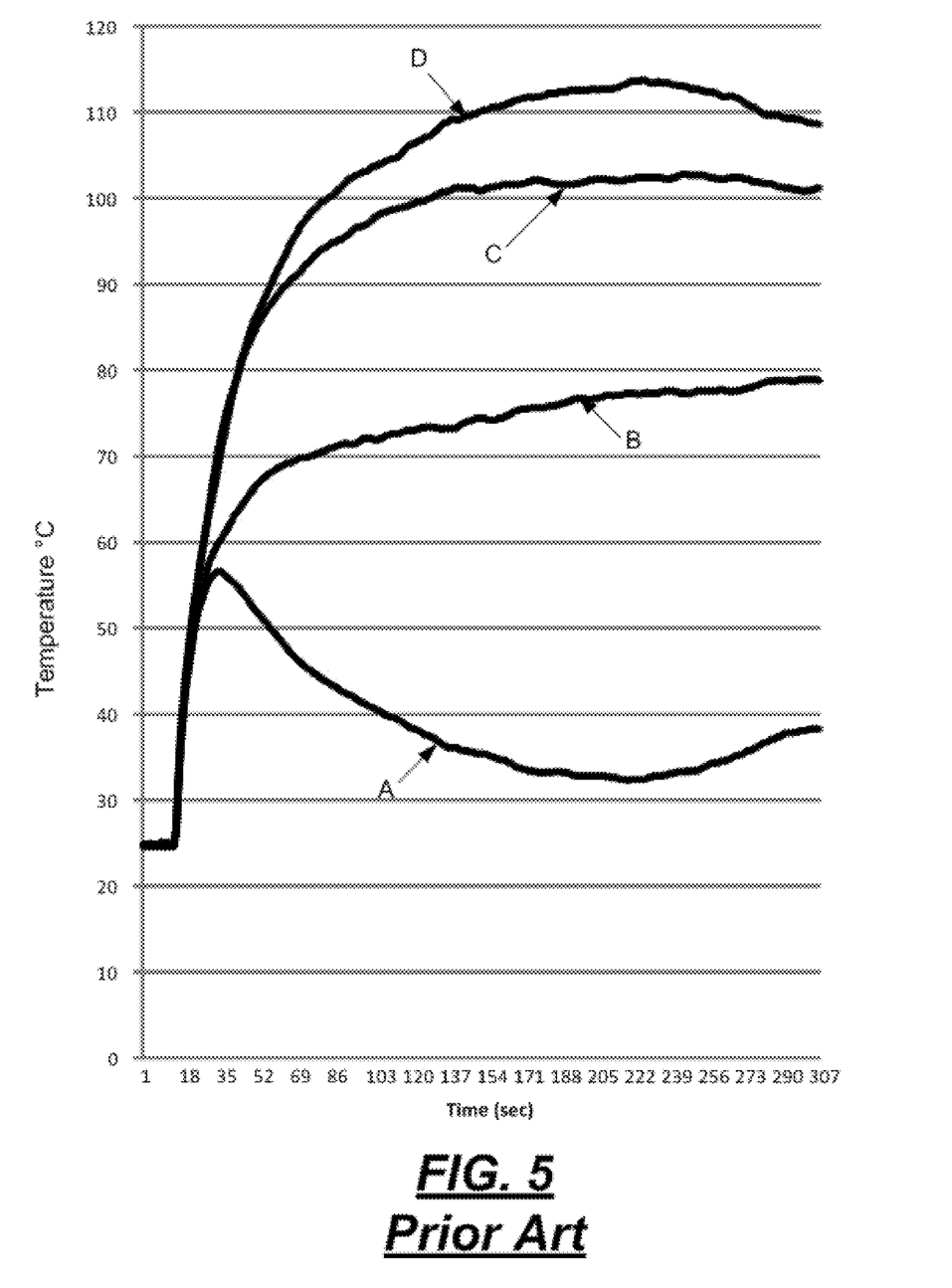
FIGS. 5 and 6 are graphical representations of exhaust gas cylinder temperatures over time for a four cylinder diesel engine using conventional fuel detergents.

In this example, a conventional succinimide dispersant additive was added to the fuel at a treat rate of 75 ppmw. FIG.

5 shows the injectors sticking after a 16 hour test with the fuel containing the conventional detergent.

Comparative Example 3

Figure 6:
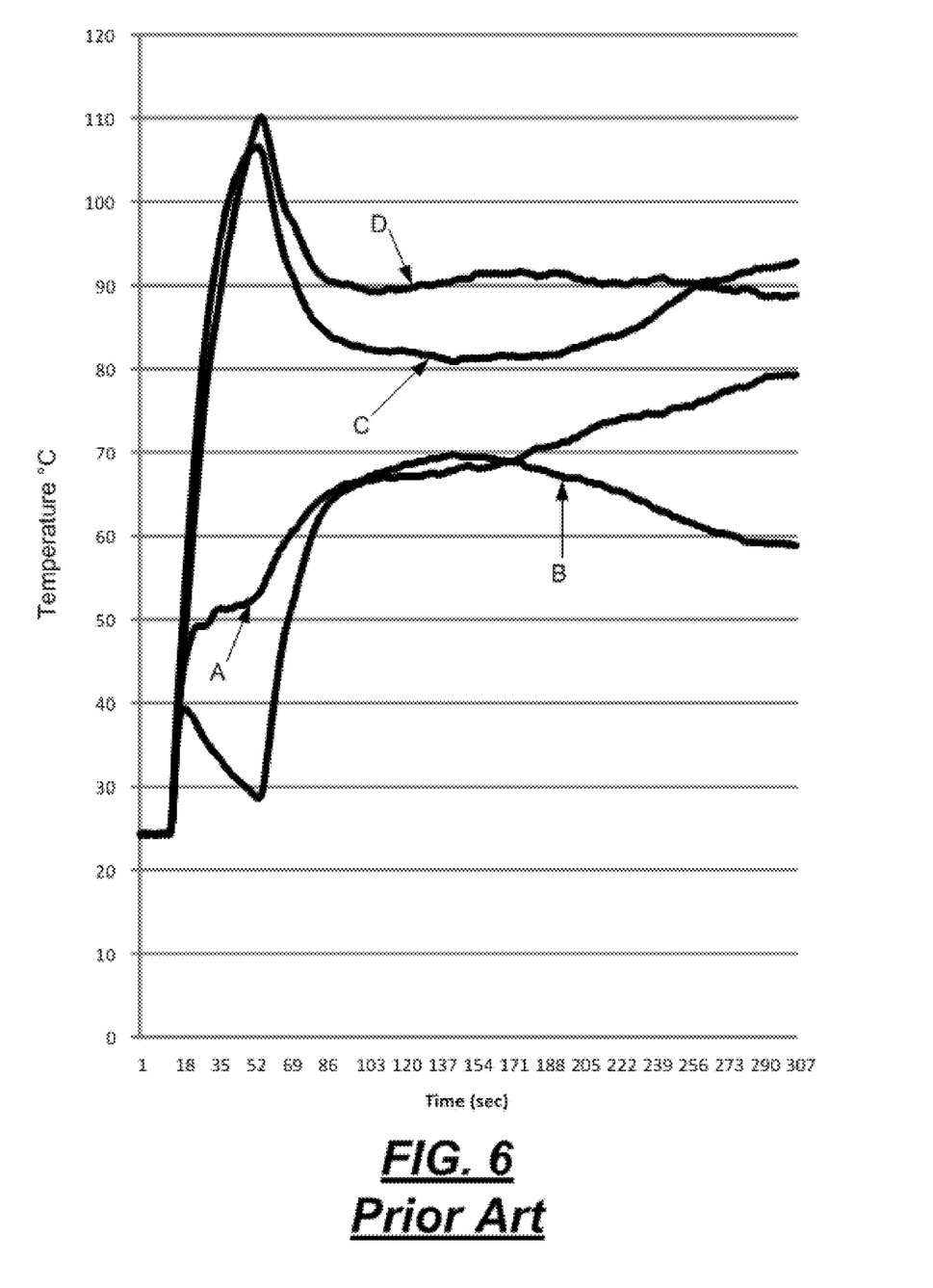

In this example a quaternary ammonium salt Diesel fuel additive package was added to the fuel at a treat rate of 75 ppmw. FIG. 6 shows the injector sticking after a 7 hour test with this fuel.

Example 4

Figure 7:
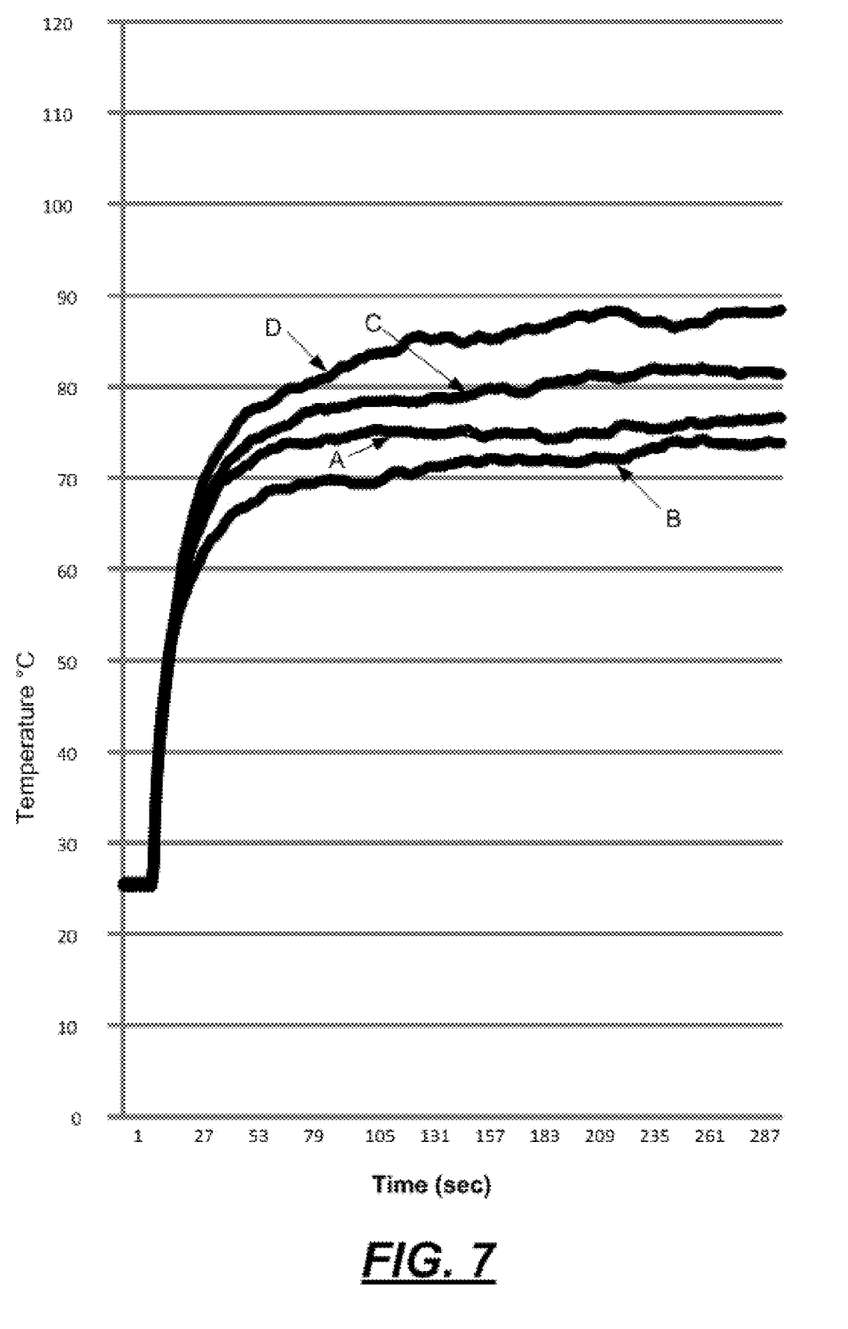
FIG. 7 is graphical representations of exhaust gas cylinder temperatures over time for a four cylinder diesel engine using a fuel detergent according to an embodiment of the disclosure.

The detergent additive of the disclosure was added to the fuel at a treat rate of 75 ppmw. After a 16 hour test, FIG. 7 shows that none of the injectors were stuck. Physical inspection of the injectors upon completion of the test confirmed that none of the injectors were stuck.

Example 5

Figure 8:
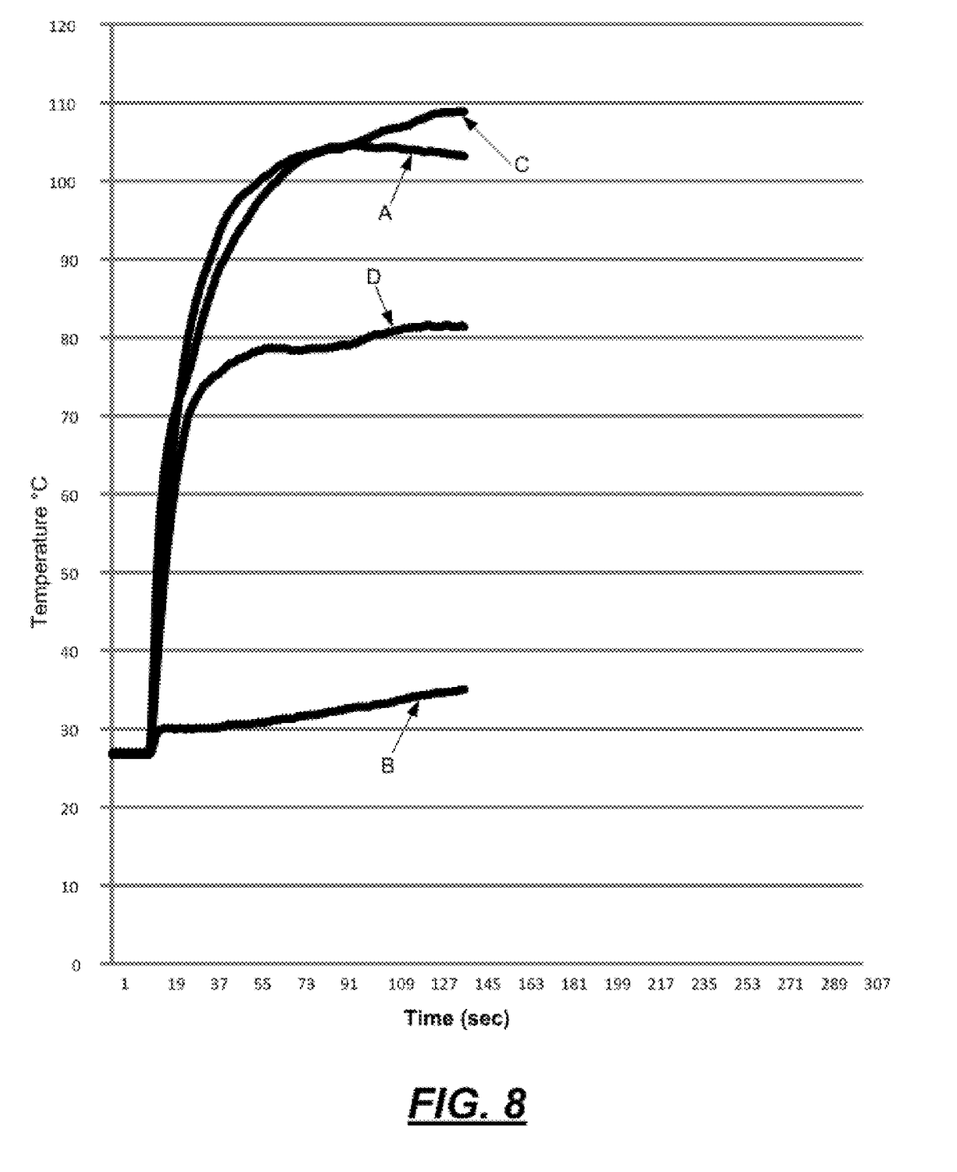
FIG. 8 is a graphical representation of exhaust gas cylinder temperatures over time for a four cylinder diesel engine at the end of a dirty up test cycle.

In this test, a base fuel containing the metal salts described above was run in the engine for 8 hours to dirty-up the fuel injectors. FIG. 8 shows that after a cold start of the engine, the injectors were stuck.

Example 6

Figure 9:
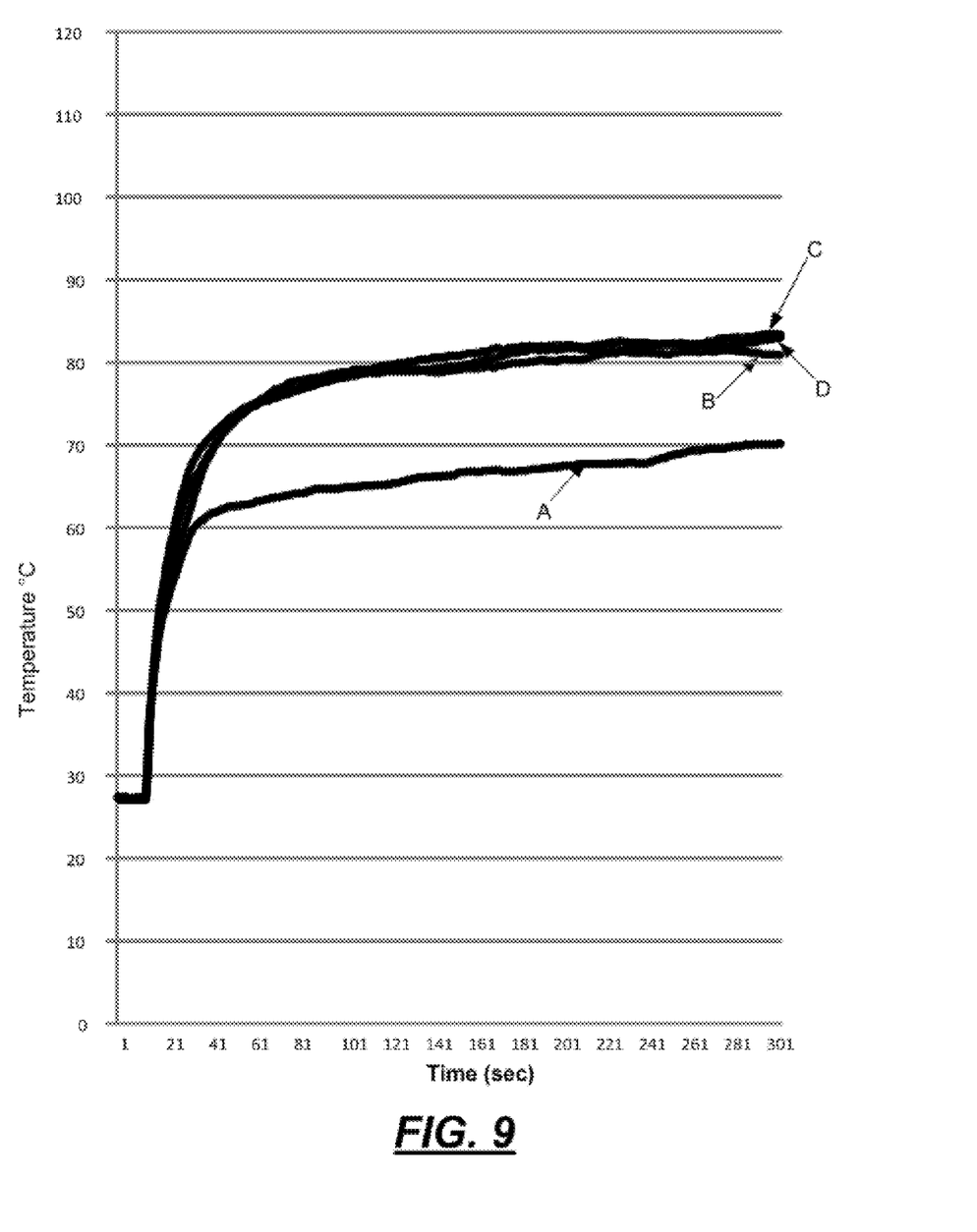
FIG. 9 is a graphical representation of exhaust gas cylinder temperatures over time for a four cylinder diesel engine using a fuel detergent according to an embodiment of the disclosure to clean-up dirty fuel injectors of FIG. 6.

In this test, the ability of the detergent additive of the disclosure to the clean-up dirty fuel injectors of FIG. 8 was demonstrated. In this example, 30 ppmw of the detergent additive of the disclosure was combined with 120 ppmw of a conventional succinimide dispersant and this mixture was added to the fuel. FIG. 9 shows that after a 16 hour test, none of the injectors were stuck.

As indicated by the foregoing examples, fuel additives containing detergent additive of the disclosure provides a significant reduction in internal deposits in diesel fuel injectors when engines are operated on ULSD fuels as compared to conventional fuel detergent additives and that the detergent additive was effective for cleaning up dirty fuel injectors.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes' of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of cleaning up internal components of a fuel injector for a diesel engine comprising operating the diesel engine on a fuel composition comprising a major amount of diesel fuel having a sulfur content of 50 ppm by weight or less and from about 20 to about 120 ppm by weight of a reaction product derived from (a) a hydrocarbyl substituted dicarboxylic acid, anhydride, or ester, wherein the hydrocarbyl group is a polyisobutylene radical having a number average molecular weight ranging from about 200 to about 3000 daltons and (b) an amine compound or salt thereof of the formula wherein R is selected from the group consisting of hydrogen and a hydrocarbyl group containing from about 1 to about 15 carbon atoms, and $R^1$ is selected from the group consisting of hydrogen and a hydrocarbyl group containing from about 1 to about 20 carbon atoms, wherein the reaction product is made under conditions sufficient to provide that the reaction product contains less than one equivalent of an amino triazole group per molecule of reaction product, and wherein the reaction product is characterized by an FTIR spectrum having a peak intensity in a region of from about 1630 $cm^{-1}$ to about 1645 $cm^{-1}$ that ranges from about 5 to about 45% of peak intensities of other peaks in a region of from about 1500 $cm^{-1}$ to about 1800 $cm^{-1}$.

2. The method of claim 1, wherein a molar ratio of (a) to (b) in the reaction product ranges from about 1:0.5 to about 1:1.5.

3. The method of claim 1, wherein the hydrocarbyl dicarboxylic acid, anhydride or ester is chosen from hydrocarbyl substituted succinic anhydrides, hydrocarbyl substituted succinic acids, and esters of hydrocarbyl substituted succinic acids.

4. The method of claim 1, wherein the reaction product is effective to remove salt deposits selected from the group consisting of transition metal, alkali metal and alkaline earth metal carboxylates from the internal components of the fuel injector.

5. The method of claim 1, wherein the fuel injected diesel engine is a direct fuel injected diesel engine.

6. The method of claim 1, wherein the amine is aminoguanidine bicarbonate.

7. A method for reducing an amount of salt deposits on internal components of a fuel injector for a fuel injected diesel engine comprising operating the diesel engine on a fuel composition comprising a major amount of fuel and from about 20 to about 120 ppm by weight of a reaction product derived from (a) a polyisobutenyl hydrocarbyl substituted dicarboxylic acid, anhydride, or ester, wherein the polyisobutenyl group has a number average molecular weight ranging from about 200 to about 3000 daltons and (b) an amine compound or salt thereof of the formula wherein R is selected from the group consisting of hydrogen and a hydrocarbyl group containing from about 1 to about 15 carbon atoms, and $R^1$ is selected from the group consisting of hydrogen and a hydrocarbyl group containing from about 1 to about 20 carbon atoms, wherein the reaction product is made under conditions sufficient to provide that the reaction product contains less than one equivalent of an amino triazole group per molecule of reaction product, wherein the reaction product is characterized by an FTIR spectrum having a peak intensity in a region of from about 1630 cm$^{-1}$ to about 1645 cm$^{-1}$ that ranges from about 5 to about 45% of peak intensities of other peaks in a region of from about 1500 cm$^{-1}$ to about 1800 cm$^{-1}$.

8. The method of claim 7, wherein the fuel injected diesel engine is a direct fuel injected diesel engine.

9. The method of claim 7, wherein a molar ratio of (a) to (b) in the reaction product ranges from about 1:0.5 to about 1:1.5.

10. The method of claim 7, wherein the salt deposits are selected from the group consisting of transition metal, alkali metal and alkaline earth metal carboxylates from the internal components of the fuel injector.

11. The method of claim 7, wherein the fuel is an ultra low sulfur diesel fuel.

12. A method for preventing plugging of a fuel filter for fuel injectors of a fuel injected diesel engine comprising operating the engine on a major amount of fuel comprising from about 20 mg to about 120 mg per Kg of fuel of a reaction product derived from (a) a polyisobutenyl substituted dicarboxylic acid, anhydride, or ester, wherein the polyisobutenyl group has a number average molecular weight ranging from about 200 to about 3000 daltons and (b) an amine compound or salt thereof of the formula wherein R is selected from the group consisting of hydrogen and a hydrocarbyl group containing from about 1 to about 15 carbon atoms, and $R^1$ is selected from the group consisting of hydrogen and a hydrocarbyl group containing from about 1 to about 20 carbon atoms, wherein the reaction product is characterized by an FTIR spectrum having a peak intensity in a region of from about 1630 cm$^{-1}$ to about 1645 cm$^{-1}$ that ranges from about 5 to about 45% of peak intensities of other peaks in a region of from about 1500 cm$^{-1}$ to about 1800 cm$^{-1}$, and wherein the reaction product is made under conditions sufficient to provide that the reaction product contains less than one equivalent of an amino triazole group per molecule of reaction product.

13. The method of claim 12, wherein the fuel filter has 2 micron openings therein for fuel flow.

14. The method of claim 12, wherein the fuel comprises an ultra low sulfur diesel (ULSD) fuel.

15. The method of claim 12, wherein the reaction product is effective to prevent plugging of the fuel filter with salt deposits selected from the group consisting of transition metal, alkali metal and alkaline earth metal carboxylates from the internal components of the fuel injector.

* * * * *